United States Patent
Tran et al.

(10) Patent No.: US 8,332,931 B1
(45) Date of Patent: Dec. 11, 2012

(54) PROCESSING COMMANDS ACCORDING TO AUTHORIZATION

(75) Inventors: Phuc Thanh Tran, Fremont, CA (US); Bing Xiao, San Jose, CA (US); Tze Lei Poo, Sunnyvale, CA (US); Peter Nhat Dinh, San Jose, CA (US)

(73) Assignee: Marvell International Ltd. (BM)

( * ) Notice: Subject to any disclaimer, the term of this patent is extended or adjusted under 35 U.S.C. 154(b) by 586 days.

(21) Appl. No.: 12/551,758

(22) Filed: Sep. 1, 2009

Related U.S. Application Data

(60) Provisional application No. 61/094,169, filed on Sep. 4, 2008.

(51) Int. Cl.
*G06F 7/04* (2006.01)
*G06F 12/14* (2006.01)

(52) U.S. Cl. .......................................................... 726/17
(58) Field of Classification Search ...................... 726/17
See application file for complete search history.

(56) References Cited

U.S. PATENT DOCUMENTS

| | | | |
|---|---|---|---|
| 6,968,453 B2 | 11/2005 | Doyle et al. | |
| 7,178,015 B2 | 2/2007 | Shaw et al. | |
| 7,296,146 B2 | 11/2007 | Shaw et al. | |
| 7,444,681 B2 | 10/2008 | Shaw et al. | |
| 7,457,945 B2 * | 11/2008 | Dailey et al. | 713/2 |
| 7,934,049 B2 * | 4/2011 | Holtzman et al. | 711/103 |
| 2002/0166062 A1 | 11/2002 | Helbig, Sr. | |
| 2005/0154331 A1 | 7/2005 | Christie et al. | |
| 2005/0154910 A1 | 7/2005 | Shaw et al. | |
| 2005/0198416 A1 | 9/2005 | Kim | |
| 2006/0143600 A1 * | 6/2006 | Cottrell et al. | 717/168 |
| 2007/0192611 A1 | 8/2007 | Datta et al. | |
| 2008/0052699 A1 * | 2/2008 | Baker et al. | 717/168 |
| 2008/0195901 A1 * | 8/2008 | Solt et al. | 714/718 |
| 2008/0196081 A1 * | 8/2008 | Hajji et al. | 726/1 |
| 2008/0311866 A1 * | 12/2008 | Roux et al. | 455/127.1 |
| 2011/0131403 A1 * | 6/2011 | Ibrahim et al. | 713/2 |

\* cited by examiner

*Primary Examiner* — Kambiz Zand
*Assistant Examiner* — Aubrey Wyszynski

(57) ABSTRACT

Devices, systems, methods, and other embodiments associated with processing commands according to authorization are described. In one embodiment, a chip includes a secure module configured to store secure firmware, and to execute the secure firmware. The secure firmware prevents the secure module from at least partially processing a command that originated from an untrusted source. The chip also includes an unsecure module configured to store unsecure firmware, and to execute the unsecure firmware. The unsecure firmware permits the unsecure module to process a command having originated from an untrusted source. The chip is configured where the unsecure firmware is separately updateable from the secure firmware.

20 Claims, 6 Drawing Sheets

PROCESSING COMMANDS ACCORDING TO AUTHORIZATION

CROSS REFERENCE TO RELATED APPLICATIONS

This application claims the benefit of U.S. provisional application Ser. No. 61/094,169, filed on Sep. 4, 2008, which is hereby incorporated by reference.

BACKGROUND

Electronic devices process a variety of data. A device may process sensitive data that an owner of the data desires to be kept private or secret. One way to keep data secret is to encrypt the data and store the encrypted data in a memory. Another way to keep data secret is by blocking unauthorized devices from accessing the data. This is accomplished by requiring devices authorized to access the data to generate a valid digital signature. Unauthorized devices cannot generate the valid digital signature and are blocked from accessing the data.

However, these and other attempts to protect data can be compromised. Keys used to encrypt the data can be stolen and used to decrypt the data. Keys used to generate a digital signature can also be stolen and used to generate the digital signature.

SUMMARY

In one embodiment, a chip includes a secure module configured to store secure firmware, and execute the secure firmware. The secure firmware prevents the secure module from at least partially processing a command that originated from an untrusted source. The chip also includes an unsecure module configured to store unsecure firmware, and execute the unsecure firmware. The unsecure firmware permits the unsecure module to process a command having originated from an untrusted source. The chip is configured where the unsecure firmware is separately updateable from the secure firmware.

In another embodiment, a chip includes an unsecure region. The unsecure region of the chip includes an unsecure datapath, and an unsecure device driver configured to at least partially control the unsecure datapath. The chip also includes a secure region. The secure region of the chip includes secure firmware, and a trusted security module configured to execute the secure firmware to determine if a command is from a trusted source. The secure firmware at least partially controls the processing of data in the unsecure data path when the command is from a trusted source.

In yet another embodiment, a method is provided. The method executes non-secure software in a non-secure region of a chip to process data in a datapath in the non-secure region. The method determines if a command is from a trusted source, where secure software executing in a secure region of the chip, at least in part, performs the determining, and where the non-secure software is updateable without updating the secure software. The method includes processing the command, where the secure software processes, at least in part, the command when the command is from a trusted source.

BRIEF DESCRIPTION OF THE DRAWINGS

The accompanying drawings, which are incorporated in and constitute a part of the specification, illustrate various example methods and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

DETAILED DESCRIPTION

Figure 1:
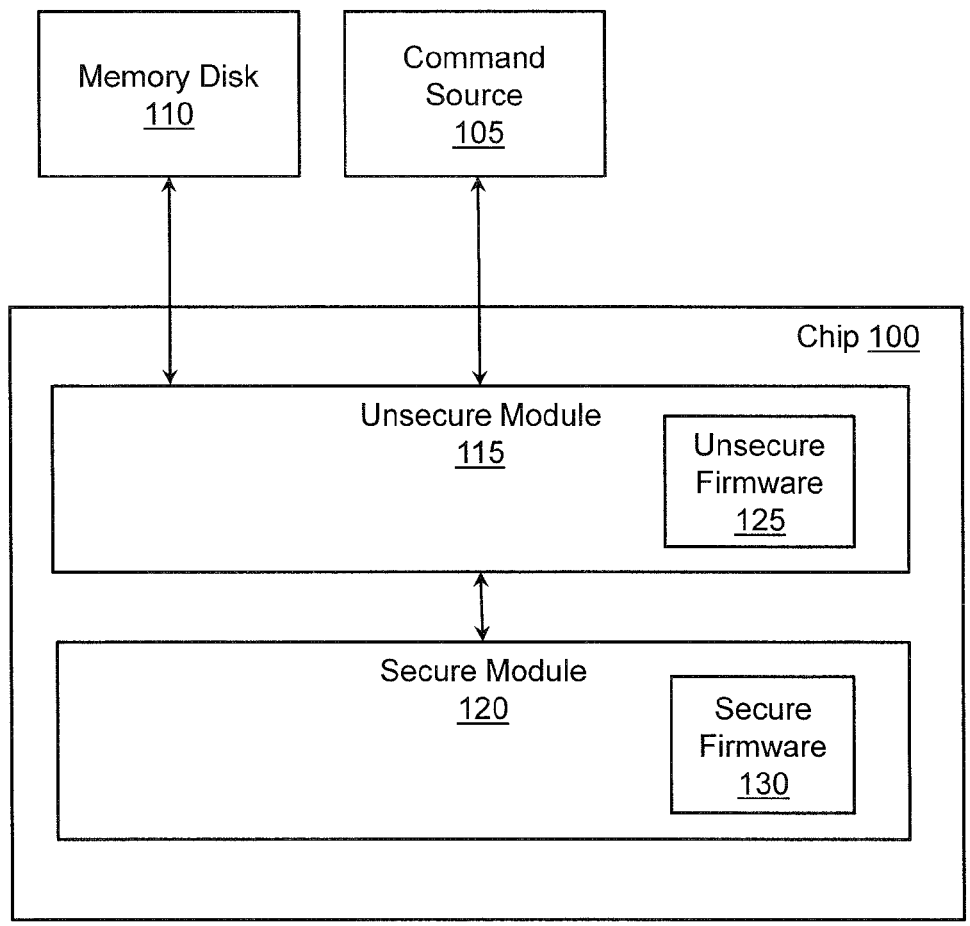
FIG. 1 illustrates an embodiment of a chip associated with processing commands according to authorization.

Described herein are example methods and other embodiments associated with protecting data. In one embodiment, a chip is partitioned to form a non-secure module and a secure module. The non-secure module includes circuits to process data in a datapath. The secure module includes circuits to apply cryptographic features to data in the datapath. The non-secure module and the secure module can be implemented in different regions of the chip.

The chip is configured to receive commands to process data. As discussed in more detail later, the secure module determines if a command is from a trusted source or a non-trusted source. The non-secure module can execute commands from a non-trusted source. However, the secure module will not apply cryptographic features to data associated with a command from a non-trusted source. For example, the secure module will not encrypt the data with a secret key stored in the secure module when the command is from a non-trusted source.

However, the secure module will operate on data associated with a command determined to be from a trusted source. For example, the secure module may use a secure key stored within the secure module to encrypt data from the trusted source. Additionally, the secure module may initiate a key exchange with the trusted source to establish secure communications between the chip and the trusted source.

Firmware (or stored instructions) running on a partitioned chip is more easily updated than a secure chip that is not partitioned. A non-partitioned chip running secure firmware is entirely re-verified as secure when updated with new secure firmware. A partitioned chip can run secure firmware in a secure module and non-secure firmware in a non-secure module. A partitioned chip does not need to be re-verified as being secure when non-secure firmware is updated and secure firmware is not updated.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element, or limitation. Furthermore, repeated use of the phrase "in one embodiment" does not necessarily refer to the same embodiment, though it may.

"Computer-readable medium", as used herein, refers to a medium that stores signals, instructions, and/or data. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an application specific integrated circuit (ASIC), a programmable logic device, a compact disk (CD), other optical medium, a random access memory (RAM), a read only memory (ROM), a memory chip or card, a memory stick, and other media from which a computer, a processor or other electronic device can read.

"Logic", as used herein, includes but is not limited to hardware, firmware, software stored or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

FIG. 1 illustrates one embodiment of a chip 100 that is configured to process commands received from a command source 105. In one embodiment, the chip 100 is a semiconductor chip implemented with integrated circuits. The command source 105 can be a disk drive controller issuing disk drive commands to process data stored on a memory disk 110 or some other computer-readable medium. As discussed in more detail below, the chip 100 determines if a command originates from a trusted source or a non-trusted source prior to executing the command. If the command is from a trusted source, the chip 100 performs both non-secure and secure operations on data associated with the command. However, if the command is from a non-trusted source, the chip 100 performs only non-secure operations on data associated with the command and does not perform secure operations.

The chip 100 is partitioned into an unsecure module 115 and a secure module 120. Unsecure firmware 125 in the unsecure module 115 is executed by devices, integrated circuits, or other logic manufactured in the unsecure module 115 of the chip 100. Firmware is generally stored software/instructions that is not often updated. Similarly, secure firmware 130 in the secure module 120 is executed by devices, integrated circuits, or other logic manufactured in the secure module 120. The unsecure firmware 125 can be updated without having to update the secure firmware 130—e.g., the unsecure firmware is separately updateable from the secure firmware. Therefore, the chip 100 will not need to be re-verified as being secure every time the unsecure firmware 125 is updated. This is because the unsecure firmware 125 does not operate to control circuits in the secure module 120. The National Institute of Standards and Technology (NIST) creates standards to verify if a device (chip) is secure. A long re-verification process meeting NIST standards is avoided when the unsecure firmware 125 is updated without updating the secure firmware 130.

The unsecure module 115 and secure module 120 are different portions of the chip 100. The unsecure module 115 can include hardware components, for example, a processor, memory, a host interface, busses, multiplexers, and/or other circuits or devices. The hardware components implement a datapath for processing data in the unsecure module 115. In response to commands received from the command source 105, the unsecure firmware 125 controls the processing of data in the datapath. For example, the unsecure firmware 125 can control the datapath to compress, decompress, or perform other unsecure functions on data in the datapath.

The unsecure module 115 and unsecure firmware 125 can act together to process commands received from a trusted source or from a non-trusted source. Processing commands from a non-trusted source allows a device external to the chip 100 to control the unsecure module 115 in an unsecure mode. However, as discussed below, the secure module 120 and secure firmware 130 do not process data associated with a non-trusted source.

Figure 2:
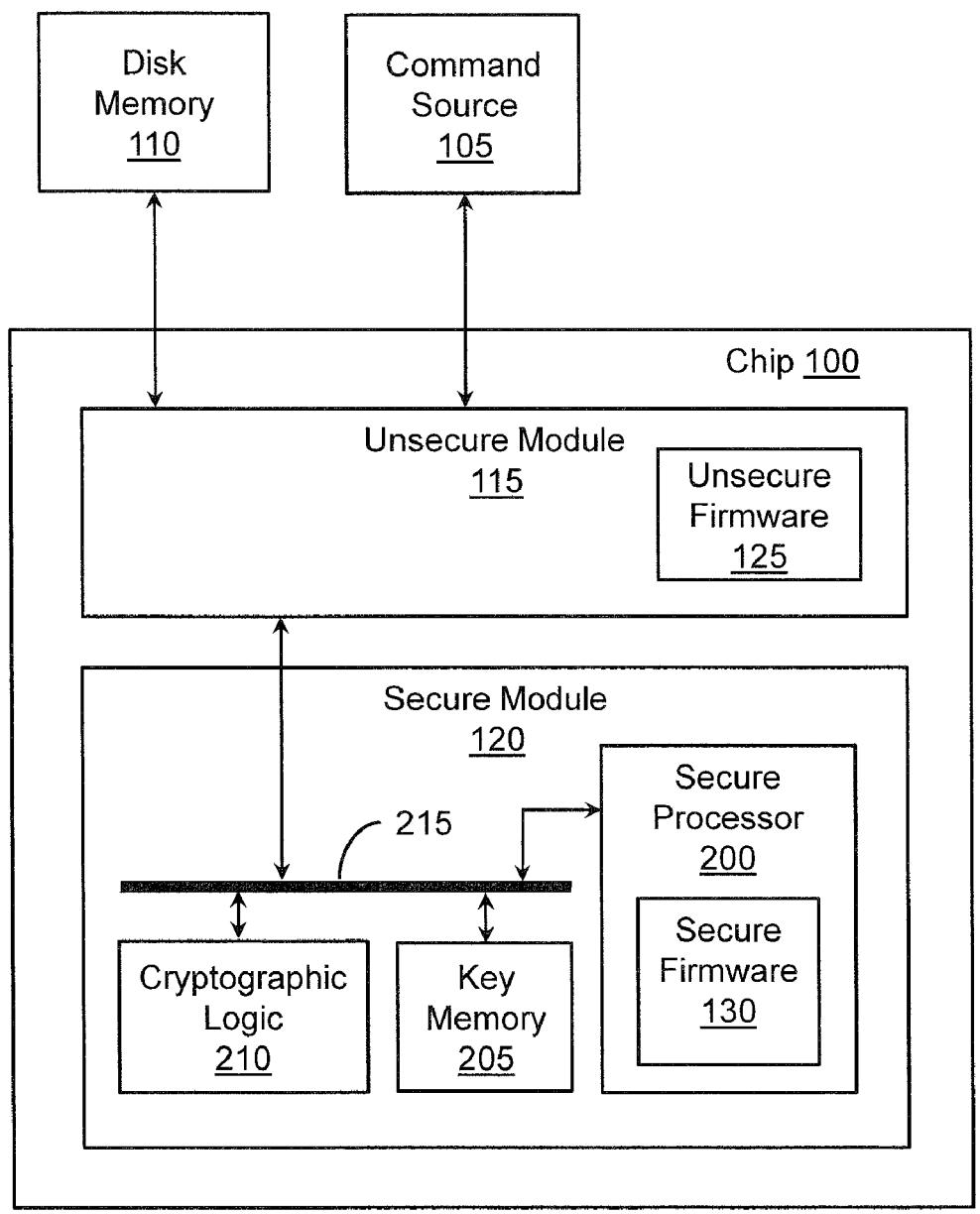
FIG. 2 illustrates another embodiment of a chip associated with processing commands according to authorization.

The secure module 120 is configured to implement cryptographic functions and/or apply cryptographic features to data in the datapath. FIG. 2 shows another embodiment of the chip 100 of FIG. 1 with additional cryptographic components. Components in FIG. 2 that are similar to components in FIG. 1 have the same reference labels. The secure module 120 in FIG. 2 includes additional cryptographic components including a secure processor 200, a key memory 205, and a cryptographic logic 210. These cryptographic components are connected to a bus 215. Those of ordinary skill in the art will appreciate that other devices such as buffers, one-time programmable (OTP) registers, input/output interfaces, and so on can also be connected to the bus 215.

The secure module 120 can determine when a command is received from a trusted source in a variety of ways. For example, the chip 100 may receive a command with a command signature included with the command. In one embodiment, the secure module 120 is configured to calculate a hash value based, at least in part, on data associated with the command. The secure module 120 calculates another hash value based on the command signature and a public key provided to the chip 100 by a transmitter of the command. The command is from a trusted source when the two hash values are the same. The secure module 120 functions to control the processing of the data when the command is from a trusted source.

The secure module 120 is configured to operate on data in the datapath of the unsecure module 115 when a command is a trusted command. For example, the secure module 120 decrypts a block of data with a first key. In one embodiment, the secure module 120 controls decryption logic (not shown) in the datapath to perform the decryption as data is moved through the datapath. The secure module 120 can also control encryption logic (not shown) in the datapath to re-encrypt the data with a second key as data is moved through the datapath. The decryption and re-encryption keys can be keys stored in the key memory 205 in the secure module 120. Re-encrypting with the second key may make the re-encrypted data more difficult for an attacker to decrypt.

In another embodiment, the secure module 120 functions to verify that an update firmware is from a trusted source. The update firmware is verified based, at least in part, on a secure key burned into the secure module 120. The secure key can be burned by a disk drive manufacturer when a disk drive is manufactured including the chip 100. The secure key allows the manufacturer a way to update the secure firmware 130 at a later time. Those without knowledge of the secure key are prevented from updating the secure firmware 130. The secure key is burned into the circuits of secure module 120 in a way that allows the secure processor 200 to read the value of the secure key. The circuits prevent a re-burning of the circuits with a new key value. For example, a one-time programmable (OTP) device, register, circuit, or logic is used. In other embodiments, the OTP device can be implemented with any programmable, non-volatile circuit.

In one embodiment, the secure key is a one-time programmable (OTP) binding key. The OTP binding key can be a hash value of another key. The update firmware is from a trusted source when a hash of the update firmware equals the OTP binding key. The secure module 120 updates the secure firmware 130 with the update firmware when the update firmware is from a trusted source. The secure firmware 130 is not updated with the update firmware when the update firmware is not from a trusted source.

In one embodiment, the cryptographic components discussed above include a cryptographic accelerator. The cryptographic accelerator calculates at least a portion of a block cipher value, a stream cipher value, a hash function value, and/or a digital signature. The cryptograph accelerator may calculate these values faster than the secure firmware 130. For example, a hash function such as secure hash algorithm-256 (SHA-256) repeatedly makes logically simple calculations and determinations to calculate a single hash value. Sometimes, circuits implemented in hardware can make these calculations and determinations faster than the secure firmware 130. Therefore, the cryptographic accelerator can implement circuits configured to calculate SHA-256 hash values. The cryptographic accelerator can implement circuits to calculate other values such as message digest-2 (MD-2) values, MD4 values, MD5 values, advanced encryption standard (AES) values, data encryption standard (DES) values, 3DES values, and other values.

In one embodiment, the key memory 205, discussed above, is configured to store a variety of keys. For example, the key memory 205 can store keys used in AES encryption/decryption, DES encryption/decryption, and other kinds of cipher operations. The key memory 205 also functions to store keys of different sizes. For example, the key memory 205 can store 128-bit AES keys, 192-bit AES keys, 256-bit AES keys, and other key sizes.

Figure 3:
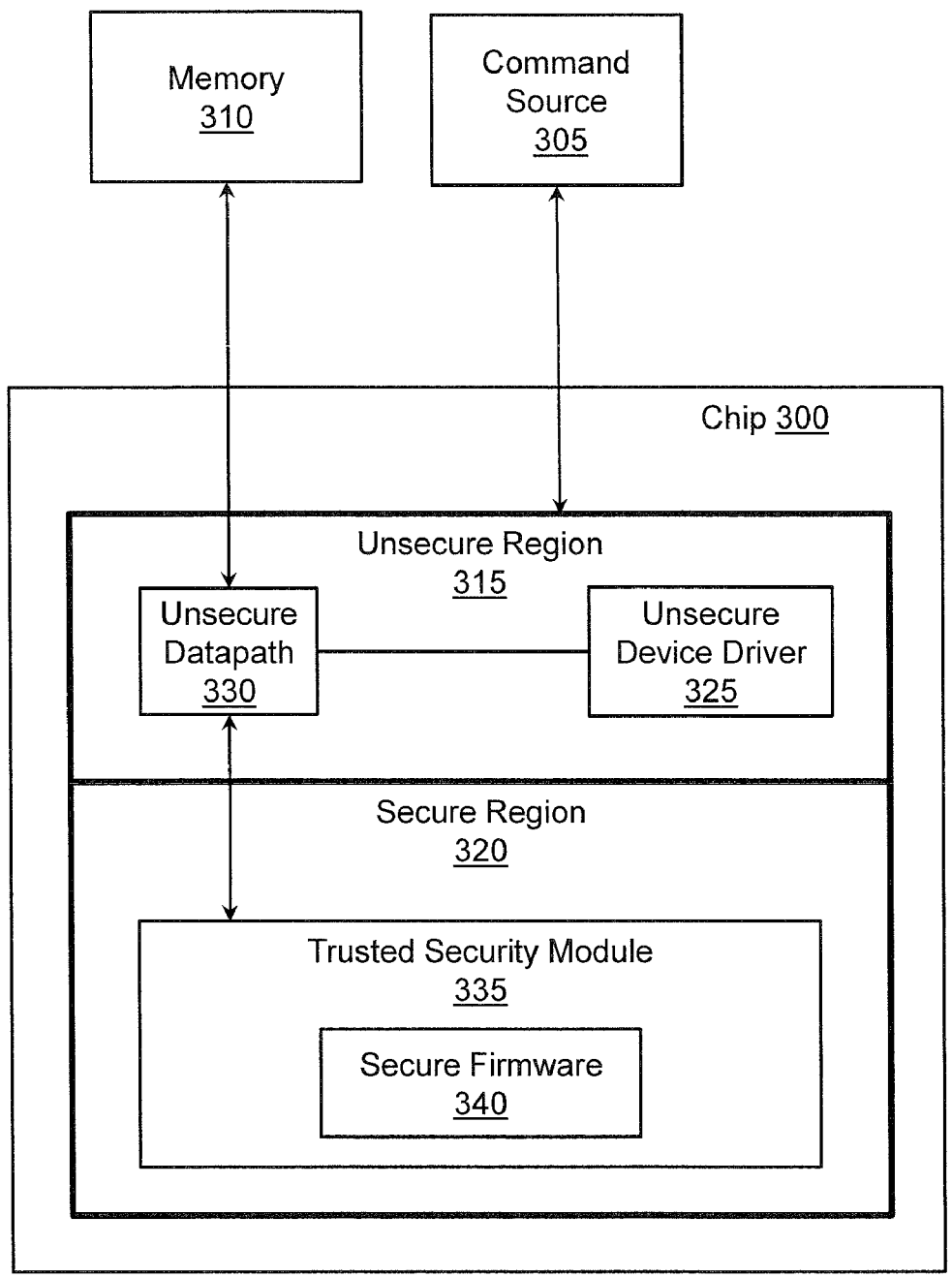
FIG. 3 illustrates an embodiment of a chip associated with processing commands according to authorization.

FIG. 3 illustrates one embodiment of a chip 300 partitioned into different regions. The chip 300 can be a system on a chip implementing silicon circuits. The chip 300 can process a command based on a trust level of the command. The chip 300 can perform secure operations on data associated with a command with a higher trust level than data associated with a command with a low trust level. For example, when a command is from a command source 305 that is a trusted source, the chip 300 will encrypt a block of data. The block of data can be retrieved from a memory 310 external to the chip 300 and then encrypted and returned to the memory 310.

The chip 300 is partitioned into an unsecure region 315 and a secure region 320. The unsecure region 315 and the secure region 320 are similar to the unsecure module 115 and the secure module 120 of FIGS. 1 and 2, discussed earlier. The unsecure region 315 includes an unsecure device driver 325. The unsecure device driver 325 functions to at least partially control an unsecure datapath 330 in the unsecure region 315. The unsecure device driver 325 can be operated on a processor in the unsecure region 315. The unsecure device driver 325 and unsecure datapath 330 can perform operations on data associated with a command received from a non-trusted source. However, logic implemented in the secure region 320 will not operate on data associated with a command received from a non-trusted source.

The secure region 320 includes a trusted security module 335. The trusted security module 335 executes secure firmware 340. The secure firmware 340 is executed, at least partially, to determine if a command is from a trusted source. As previously discussed, this determination can be made in a variety of ways. For example, a command signature of the command can be compared with a secure key stored in the secure region 320. The command is from a trusted source when the command signature and secure key are the same. The secure firmware 340, at least partially, controls the processing of data in the unsecure data path when the command is from a trusted source. For example, the secure firmware 340 may control a portion of the unsecure datapath 330 to encrypt or decrypt data in the datapath 330 based on a cipher key stored in the secure region 320.

In one embodiment, the command signature corresponds to a manufacturing identification (ID). The manufacturing ID can be assigned by a disk drive manufacturer at the time a disk drive is manufactured including the chip 300.

Software, firmware, the unsecure device driver 325, and the like running in the unsecure region 315 can be updated without re-verifying the chip 300. As previously mentioned, this can save significant time when the chip 300 needs to meet National Institute of Standards and Technology (NIST) security standards.

In one embodiment, the secure key may be derived from a one-time programmable (OTP) root key value that has been burned into the secure region 320 of the chip 300. Equipment manufacturers such as disk drive manufactures will generally burn OTP values into the chip 300 at a time the chip 300 becomes part of a disk drive. With the protected secure firmware region 340, after the region 340 is locked up by the manufacturer, the secret key (e.g. random value via the secure firmware and built-in hardware) can be generated by the firmware 340 without the knowledge of the manufacturer. OTP values cannot be reset or re-written after they are burned into the chip 300. The secret key cannot be altered by the unsecure firmware. However, the secure firmware 340 can reset the secret key as in the case where the disk drive has authenticated a request to open up or reuse the disk drive in an unsecure device. Of course, since the secure key is reset, the value of the original secure key is destroyed. As such, all data on the drives that was encrypted with the original secure key is protected since the data cannot be decrypted without the original secure key.

At times, the secure firmware 340 may need to be updated with a new secure firmware. To ensure the new secure firmware is authentic, the secure firmware 340 functions to verify the new secure firmware. The new secure firmware is verified based, at least in part, on an OTP binding signature and a signature of the new secure firmware. For example, the OTP binding signature can be hashed with another key to determine a hash value. The new secure firmware signature may be another hash value of a key and the new secure firmware. The new secure firmware is determined to be authentic and from a trusted source when these hash values are the same. The trusted security module 335 replaces the secure firmware 340 with the new secure firmware when the new secure firmware is authenticated.

The chip 300 can be tested after manufacturing with a built-in self test. This type of testing will result in test values of devices located in the unsecure region 315 and the secure region 320 being output to a device external to the chip 300 for evaluation. It may be undesirable to have unsecure test values of the secure region 320 output during testing. Therefore, a secure port control value is burned into the secure region 320. The secure port control value can be an OTP value. The secure port control value determines what circuits participate in a built-in self test (BIST) of the chip 300 and what circuits do not participate in the BIST. For example, if bit 24 of the secure port value is set, then the trusted security module 335 does not participate in the BIST and no data is output from the trusted security module 335.

In another embodiment, when the command is from a trusted source, the secure firmware 340 initiates a secure key exchange between the system on a chip and the trusted source. The key exchange can be based on pairs of keys as understood by those of ordinary skill in the art. For example, the trusted security module 335 is configured to initiate a Diffie-Hellman key exchange with the trusted source. The trusted security module 335 generates a private key and a public key. The public key is sent to the trusted source. Next, the trusted source generates a new pair of private and public keys, and the new public key is transmitted back to the trusted security module 335. The private keys are not transmitted. The trusted security module 335 can then generate a key based on its own private key and the public key from the trusted source. The trusted security module 335 processes data associated with the trusted source based, at least in part, on the public key. The exchanged public keys can also be used to create secure communications between the trusted security module 335 and the trusted source.

Example methods may be better appreciated with reference to flow diagrams. While for purposes of simplicity of explanation, the illustrated methodologies are shown and described as a series of blocks, it is to be appreciated that the methodologies are not limited by the order of the blocks, as some blocks can occur in different orders and/or concurrently with other blocks from that shown and described. Moreover, less than all the illustrated blocks may be required to implement an example methodology. Blocks may be combined or separated into multiple components. Furthermore, additional and/or alternative methodologies can employ additional, not illustrated blocks.

Figure 4:
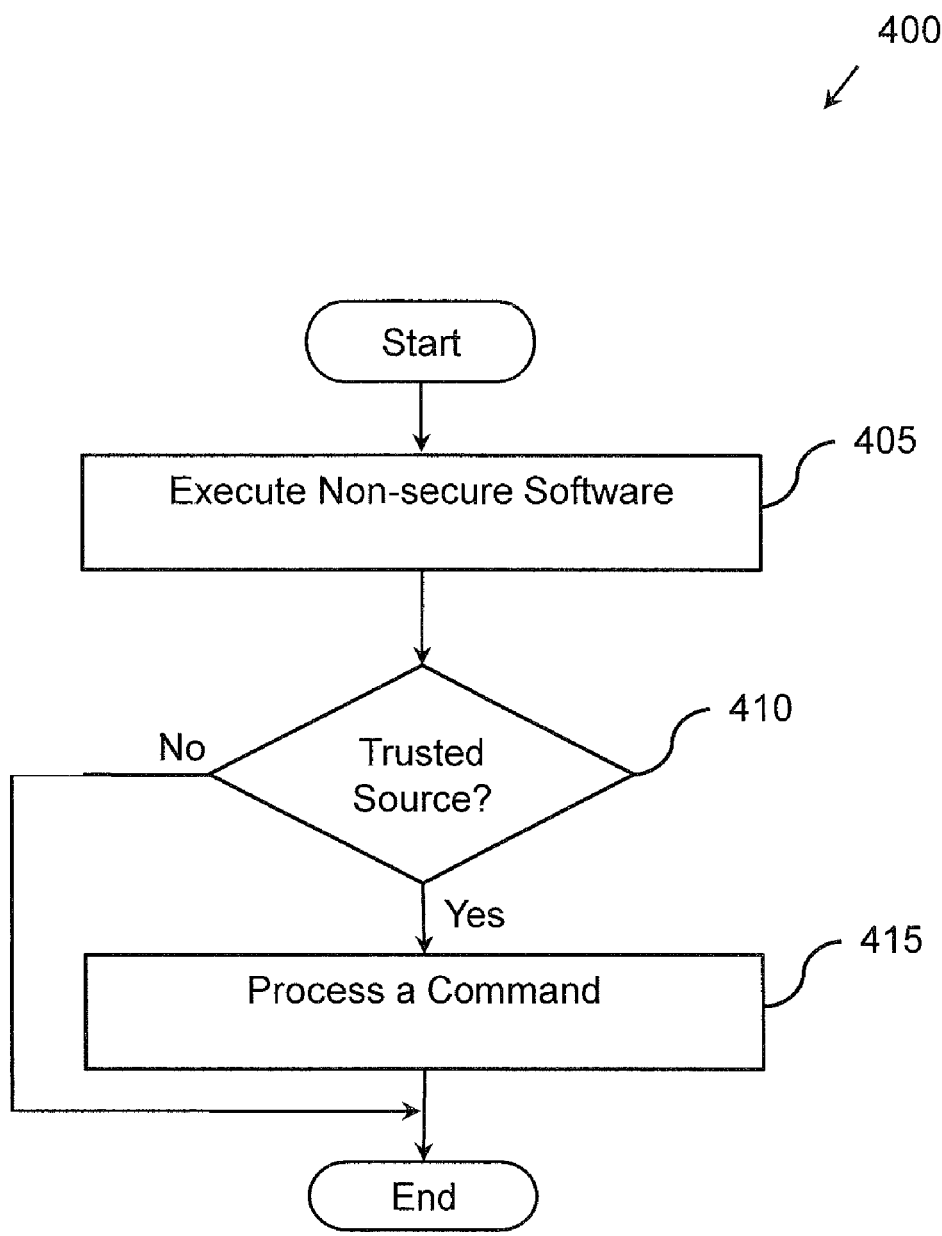
FIG. 4 illustrates an embodiment of a method associated with processing commands according to authorization.

FIG. 4 illustrates an embodiment of a method 400 associated with processing a command. The command is processed according to a trust level associated with the command. As discussed above, a command can have a high trust level when the command originated from a trusted source. A command that did not originate from a trusted source may have a lower trust level. Data associated with a command from a trusted source can be processed more extensively than data associated with a command from a non-trusted source.

The method 400 can be at least partially executed by a chip. The chip includes a non-secure region and a secure region. The non-secure region and secure region are different areas of the chip. Non-secure software in the non-secure region processes data in the non-secure region. As discussed in more detail below, secure software in the secure region additionally processes the data in the secure region. As discussed above, the non-secure software can be updated without updating the secure software. The chip will not need to be re-verified when the non-secure software is updated and the secure software is not updated.

The method 400 begins by executing non-secure software, at 405, in the non-secure region of a chip. For example, the command may be a disk drive controller command to process a block of data. The data is generally processed in a datapath in the non-secure region. For example, the non-secure software can control the datapath to check parity bits and to correct data errors as the block of data travels through the datapath.

The method 400 determines, at 410, whether a command is from a trusted source. The secure software executing in a secure region of the chip at least in part performs the determination at 410. As discussed above, hash values can be calculated and compared to determine if the command was from a trusted source.

The command is processed at 415. The secure software processes the command, at least in part, when the command is from a trusted source. For example, the command may be a request to process a region of disk memory. The disk memory can be read by the un-secure software and then encrypted by the secure software.

Figure 5:
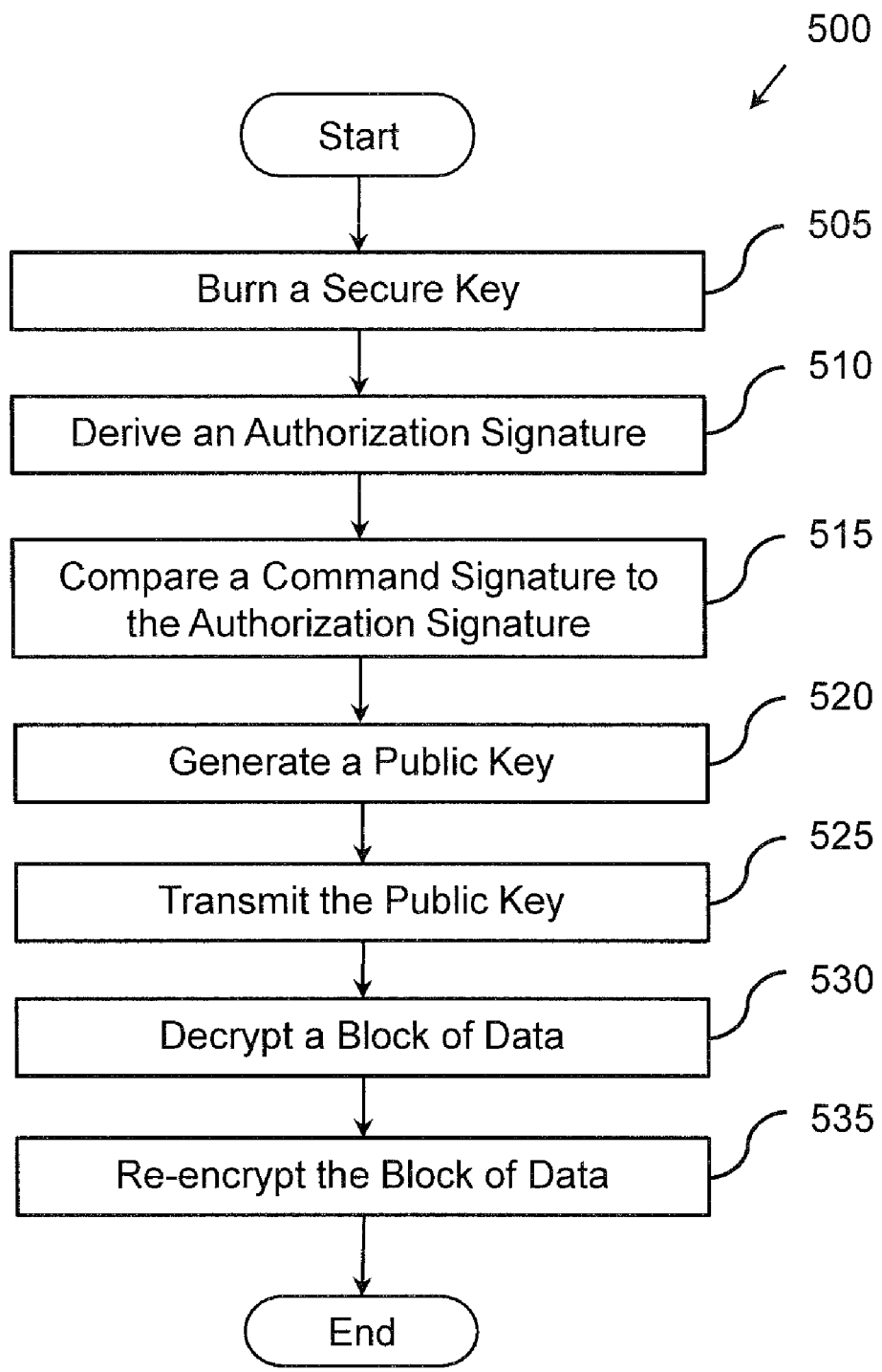
FIG. 5 illustrates another embodiment of a method associated with processing commands according to authorization.

FIG. 5 illustrates an embodiment of a method 500 associated with processing a command based on a trust associated with the command. The method 500 can be at least partially implemented in a chip that implements a system on a chip. The method 500 begins by burning, at 505, a secure key into a secure region of a chip. The secure key can be a one-time programmable (OTP) value burned into circuits of the chip as discussed above. In another embodiment, the burned-in value is treated as a root key that is used to generate the secure key. The secure key can then be altered or reset by secure software running in the secure region of the chip. For example, the new secure key can be generated from the root key and the previous secure key is deleted. As previously stated, this situation can occur when the disk drive/memory is reused in a non-secure device. Once the secure key is reset, all data stored on the drive that was encrypted with the previous secure key cannot be decrypted and thus is protected. The firmware in the non-secure region cannot alter the secure key.

Once the chip is in operation, commands are received and processed. For example, a command may have been received externally from the chip. In one embodiment, the command is a disk drive controller command to process data represented as a block of data. To determine if a command was received from a trusted source, an authorization signature is derived at 510. The authorization signature is derived, at 510, from a root key burned into the secure region. The authorized signature may be a hash value of the root key or another value based on the root key. A command signature of the command is compared, at 515, to the authorization signature. The command is from a trusted source when the command signature is the same as the authorization signature.

A Diffie-Hellman key exchange may be initiated and controlled by the secure software. The key exchange begins by generating a public key, at 520, and a private key when the command is from a trusted source. The public key and private keys may be generated based on the secure key burned into the chip as discussed above.

The public key is transmitted, at 525, to the trusted source. The trusted source can transmit subsequent messages that are encrypted based, at least in part, on the public key. The method 500 can also encrypt messages transmitted to the trusted source based, at least in part, on a private key.

The method 500 may also process a command that requests decrypting an original block of disk drive data and then re-encrypting the block. The block of data is decrypted, at 530, with a first key when the command is from a trusted source. The block of data is re-encrypted, at 535, with a second key when the command is from a trusted source. The re-encrypted block of data may be more secure than the original block of data.

It will be appreciated that in one embodiment, the methods herein may be implemented as computer executable instructions embodied and stored on a computer-readable medium. When executed by a machine (e.g., processor, device) the instructions cause the machine to perform the methods herein and their equivalents. The methods may be implemented in a semiconductor chip. The methods can also be implemented with circuits and/or hardware logic.

Figure 6:
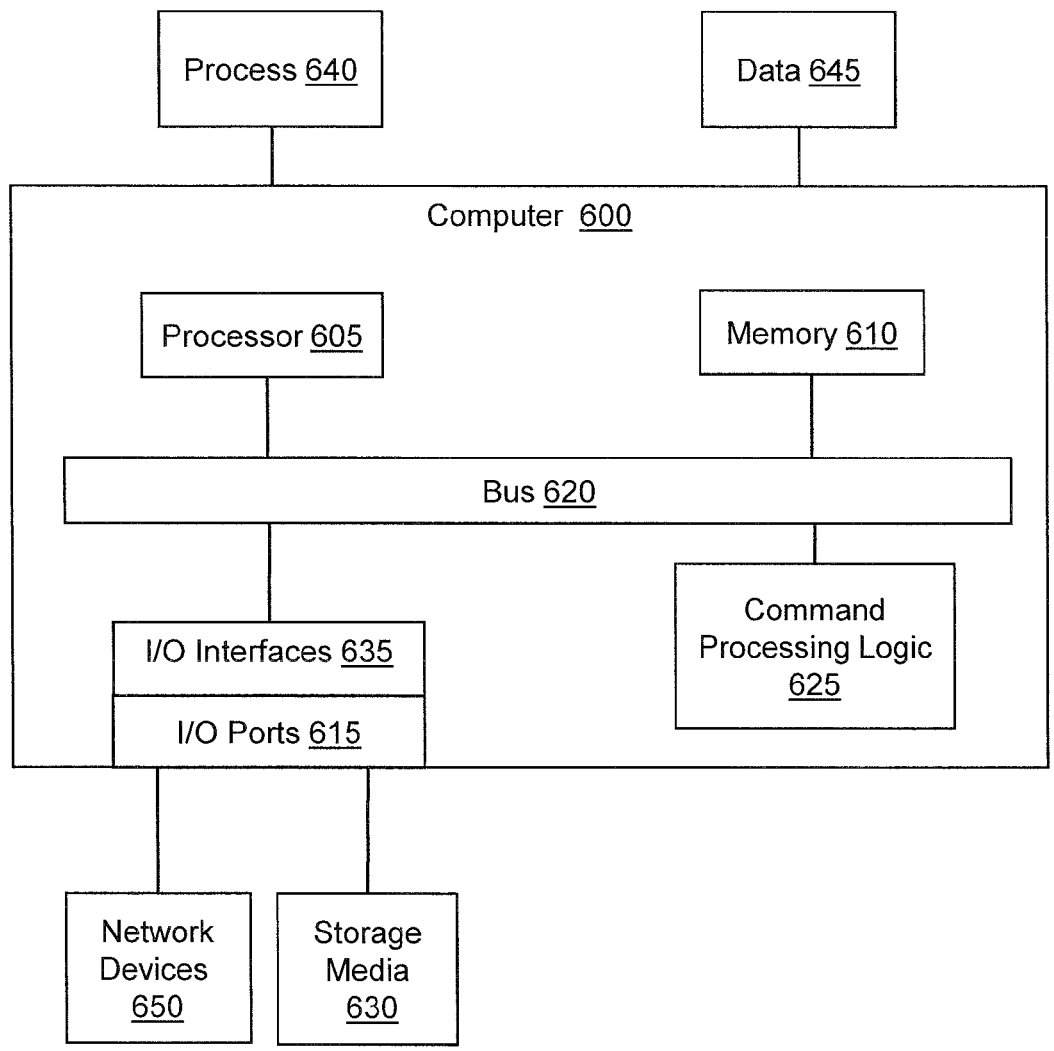
FIG. 6 illustrates an embodiment of a computing environment in which example methods and equivalents associated with processing commands according to authorization may be implemented.

FIG. 6 illustrates an example computer 600 in which example systems and methods described herein, and equivalents, are implemented. The example computer 600 comprises a processor 605, a memory 610, and input/output ports 615 operably connected by a bus 620. In one example, the computer 600 is implemented with command processing logic 625 configured to process a command based, at least in part, on whether the command is from a trusted source. In one embodiment, the command processing logic 625 is configured in a chip. The chip is partitioned into a secure area and an unsecure area. Hardware, circuits, software, and/or other logic in the secure area will participate in the processing of commands from a trusted source.

The command processing logic 625 provides means (e.g., hardware, stored software, firmware) to process commands based, at least in part, on whether the command is from a trusted source. The command processing logic 625 can be implemented similar to chips 100, 200, and 300 of FIG. 1, FIG. 2, and FIG. 3, respectively, and/or combinations of their features. The command processing logic 625 can include logic implemented, for example, as an ASIC or other type of circuit.

Generally describing an example configuration of the computer 600, the processor 605 can be a variety of various processors including dual microprocessor and other multi-processor architectures. The memory 610 can include volatile memory and/or non-volatile memory. Non-volatile memory may include, for example, read-only memory (ROM), programmable read only memory (PROM), erasable programmable read only memory (EPROM), electronically erasable programmable read only memory (EEPROM), and so on. Volatile memory may include, for example, random access memory (RAM), static random access memory (SRAM), dynamic random access memory (DRAM), and so on.

A storage media 630 can be operably connected to the computer 600 via, for example, an input/output interface (e.g., card, device) 635 and the input/output port 615. The storage media 630 can be, for example, a magnetic disk drive, a solid state disk drive, a floppy disk drive, a tape drive, a Zip drive, a flash memory card, a memory stick, and so on. Furthermore, the storage media 630 can be a compact disk read-only memory (CD-ROM) drive, a compact disk recordable (CD-R) drive, a compact disk rewritable (CD-RW) drive, a digital video disk read-only memory (DVD ROM), and so on. The memory 610 can store a process 640 and/or a data 645, for example. The storage media 630 and/or the memory 610 can store an operating system that controls and allocates resources of the computer 600.

The bus 620 can be a single internal bus interconnect architecture and/or other bus or mesh architectures. While a single bus is illustrated, it is appreciated that the computer 600 may communicate with various devices, logics, and peripherals using other busses (e.g., peripheral component interconnect express (PCIE), 1394, universal serial bus (USB), Ethernet). The bus 620 can be types including, for example, a memory bus, a memory controller, a peripheral bus, an external bus, a crossbar switch, and/or a local bus.

The computer 600 may interact with input/output devices via the input/output (I/O) interfaces 635. Input/output devices can be, for example, a keyboard, a microphone, a pointing and selection device, cameras, video cards, displays, the storage media 630, the network devices 650, and so on. The input/output ports 615 may include, for example, serial ports, parallel ports, and USB ports.

The computer 600 can operate in a network environment and thus be connected to the network devices 650 via the I/O interfaces 635, and/or the I/O ports 615. Through the network devices 650, the computer 600 can interact with a network. Through the network, the computer 600 may be logically connected to remote computers. Networks with which the computer 600 may interact include, but are not limited to, a local area network (LAN), a wide local area network (WLAN), a wide area network (WAN), and other networks.

While example methods, and so on have been illustrated by describing examples, and while the examples have been described in considerable detail, it is not the intention of the applicants to restrict or in any way limit the scope of the appended claims to such detail. It is, of course, not possible to describe every conceivable combination of components or methodologies for purposes of describing the methods, embodiments, and so on described herein. Therefore, the invention is not limited to the specific details, the representative embodiments, and illustrative examples shown and described. Thus, this application is intended to embrace alterations, modifications, and variations that fall within the scope of the appended claims.

What is claimed is:

1. A chip, comprising:
   a secure module configured to:
      store secure firmware; and
      execute the secure firmware to process data flowing in a datapath, wherein the secure firmware prevents the secure module from at least partially processing a command having originated from an untrusted source;
   an unsecure module configured to:
      store unsecure firmware; and
      execute the unsecure firmware to further process the data flowing in the datapath, wherein the unsecure firmware permits the unsecure module to process a command having originated from an untrusted source,
   wherein the unsecure firmware is separately updateable from the secure firmware.

2. The chip of claim 1, wherein:
   the secure module further includes a secure key burned into the secure module;
   the secure module is configured to verify secure update firmware based, at least in part, on the secure key; and
   the secure update firmware is verified prior to updating the secure firmware with the secure update firmware.

3. The chip of claim 1, wherein:
   the secure module is configured to receive a command with a command signature to process data;
   the secure firmware is configured to authenticate the command signature to determine if the command originated from a trusted source; and
   the secure module is configured to control a processing of the data in response to the command having originated from a trusted source.

4. The chip of claim 1, wherein the secure module further includes a cryptographic accelerator to calculate at least a portion of one or more of: a block cipher, a stream cipher, a hash function, and a digital signature.

5. The chip of claim 1, wherein the secure module further includes:
   a bus;

a secure processor configured to execute the secure firmware;

a key memory configured to store cryptographic keys; and a cryptographic logic configured to calculate cryptographic values, wherein the secure processor, the memory, and the cryptographic logic are connected to the bus.

6. The chip of claim 1, wherein the secure module is configured to:

decrypt a block of data with a first key; and re-encrypt the block of data with a second key.

7. The chip of claim 1, wherein:

the chip is a semiconductor chip implemented with integrated circuits;

the secure module includes at least one integrated circuit; and the unsecure module includes at least one integrated circuit.

8. The chip of claim 1, wherein the chip is configured to receive disk drive data and process the disk drive data.

9. A chip, comprising:

an unsecure region, the unsecure region of the chip including an unsecure datapath; and an unsecure device driver configured to at least partially control the unsecure datapath;

a secure region, the secure region of the chip including:

secure firmware; and a trusted security module configured to execute the secure firmware to determine if a command is from a trusted source, wherein the secure firmware performs cryptographic processing on data in the unsecure data path when the command is from a trusted source.

10. The chip of claim 9, wherein the secure firmware is configured to determine if the command is from the trusted source based, at least in part, on comparing a command signature with a secure key stored in the secure region.

11. The chip of claim 10, wherein the secure firmware is configured to derive the secure key from a one-time programmable (OTP) root key burned into the secure region.

12. The chip of claim 9, wherein:

the secure firmware is configured to verify new secure firmware;

the new secure firmware is verified based, at least in part, on a one-time programmable (OTP) binding signature and a signature of the new secure firmware;

the OTP binding signature is burned into the secure region; and the trusted security module is configured to replace the secure firmware with the new secure firmware in response to the new secure firmware being authentic.

13. The chip of claim 9, wherein:

a secure port control value is burned into the secure region; and the secure port control value determines which circuits participate in a built-in self test (BIST) of the chip and which circuits do not participate in the BIST.

14. The chip of claim 9, wherein:

in response to the command being from the trusted source, the secure firmware initiates a secure key exchange between the chip and the trusted source, the chip receives a public key from the trusted source, and the secure firmware at least partially controls the processing of data based, at least in part, on the public key.

15. A method, comprising:

executing non-secure software in a non-secure region of a chip to process data in a datapath in the non-secure region;

executing secure software in a secure region of the chip to determine if a command is from a trusted source, when the command is from a trusted source, processing the data in the datapath in accordance with the command, with the secure software; and where the non-secure software can be updated without updating the secure software.

16. The method of claim 15, wherein the determining if the command is from a trusted source comprises:

deriving an authorization signature from a root key burned into the secure region; and comparing a command signature of the command to the authorization signature, where the command is from a trusted source when the command signature equals the authorization signature.

17. The method of claim 15, comprising:

generating a public key and a private key when the command is from a trusted source; and transmitting the public key to the trusted source, where at least some data received by the chip is encrypted based, at least in part, on the private key.

18. The method of claim 15, wherein the processing the command comprises:

decrypting a block of data with a first key; and re-encrypting the block of data with a second key.

19. The method of claim 15, comprising:

burning a secure key into the secure region, where the secure key cannot be altered by the secure software or the non-secure software, and where the determining if the command is from a trusted source is based, at least in part, on the secure key.

20. The method of claim 15, wherein the command is received from a disk drive controller, and where the command is a request to process data represented as a block of data.

* * * * *